3,017,446
PREPARATION OF MATERIAL FOR
THERMOCOUPLES
Hiroshi Julian Goldsmid, South Ruislip, and Anthony Robert Sheard, Northwood, England, assignors to The General Electric Company Limited, London, England
No Drawing. Original application Dec. 16, 1957, Ser. No. 702,936, now Patent No. 2,990,439, dated June 27, 1961. Divided and this application Jan. 8, 1960, Ser. No. 1,186
Claims priority, application Great Britain Dec. 18, 1956
5 Claims. (Cl. 136—5)

This application is a division of our application Serial No. 702,936, filed December 16, 1957, now Patent No. 2,990,439, which discloses and claims a thermocouple in which at least one element consists essentially of a semiconductor having a constitutional formula $$Bi_m Sb_n Te_p Se_q S_r$$

(where $n$ has a value in the range 0–1.8, $q$ has a value in the range 0–0.4 and $r$ has a value in the range 0–0.24, subject to the conditions that $m+n=2$, $p+q+r=3$, $3n+2q+2r$ is not less than 0.03, and $3q+5r$ is not greater than 1.2), the semiconductor having a crystal structure similar to that of bismuth telluride and each crystal of the semiconductor in the element being orientated with its principal crystal axis substantially perpendicular to the direction of the length of the element between the junctions of the thermocouple.

It is an object of the present invention to provide a method of preparing material for the elements of thermocouples as disclosed in the parent application.

According to the invention, a method of preparing material for thermocouple elements comprises the steps of: melting together in vacuo bismuth, tellurium, and at least one of the elements antimony, selenium and sulphur, in proportions corresponding to a constitutional formula $Bi_m Sb_n Te_p Se_q S_r$ such that $n$ has a value in the range 0–1.8, $q$ has a value in the range 0.04 and $r$ has a value in the range 0–0.24, subject to the conditions that $m+n=2$, $p+q+r=3$, $3n+2q+2r$ is not less than 0.03, and $3q+5r$ is not greater than 1.2; producing from the molten material an elongated solid ingot; and subjecting the ingot to the process known as "zone melting."

In one method of putting the present invention into effect, the semiconductors utilised in thermocouples as disclosed in the parent application may be prepared in the following manner. Bismuth, tellurium, and at least one of the elements antimony, selenium and sulphur are placed together in a cylindrical silica bomb having a length of about 17.5 centimetres and a diameter of 2.5 centimetres. The total weight of the constituents is made about 300 grams, the relative proportions of the elements corresponding to the desired composition of the semiconductor. The bomb is evacuated to produce inside it a vacuum corresponding to a pressure of less than $10^{-5}$ millimetres of mercury, and is then sealed.

The sealed bomb is then heated in a furnace at a temperature of 900° C. for at least three hours, in order to bring about complete formation of the semiconductor. After cooling to room temperature and removal from the bomb, the charge is loaded into a silica boat having dimensions of approximately 15 centimetres by 2.5 centimetres by 1.8 centimetres. The charge is then just melted by high frequency induction heating under an inert atmosphere so that it takes up the shape of the boat, and is then immediately cooled to room temperature to form a solid ingot.

The solidified ingot in the boat is then subjected to the process known as "reverse pass zone melting," in which a molten zone is formed at one end of the ingot and is caused to traverse the whole length of the ingot, first in one direction and then in the opposite direction; the process is carried out under a slow flow of inert gas at atmospheric pressure, and the rate of advance of the molten zone along the ingot may conveniently be of the order of 2.5 centimetres per hour.

The resultant ingot is found to consist of one or more crystals for each of which the principal crystal axis is disposed perpendicular to the longitudinal axis of the ingot; it should be noted that in the case of a polycrystalline ingot the principal crystal axes of the various crystals are not necessarily parallel to each other. It will be appreciated that if elements for thermocouples according to the parent application are cut from such an ingot they will be cut in such a manner that the directions of their lengths are parallel to the longitudinal axis of the ingot.

Ingots prepared by the above method are found to be uniformly P-type; the electrical conductivity of the ingots increases with increase of the antimony content, and decreases with increase of the selenium or sulphur content, of the semiconductor.

In view of this fact, it will be apparent that in order to obtain N-type material it is necessary to introduce some donor impurity into the semiconductor; further, in many cases it will be desirable to introduce some donor impurity even where P-type material is required, in order that the electrical conductivity of the resultant material should have a value closer to the optimum value for use of the material in producing thermocouple elements than would be the case if no such impurity were introduced. Suitable impurities for this purpose are iodine, bromine, chlorine, tellurium and lithium. In some cases it may be desirable to introduce an acceptor impurity; for this purpose the elements lead, cadmium and bismuth are suitable. Where any of these elements except the halogens is used, the semiconductor is prepared by the method described above, the impurity element being added in the desired proportion to the constituent elements of the semiconductor in the starting material. Where one of the halogens is used, however, a slightly modified method of preparation is preferred, because of the volatility of these elements.

One example of the use of iodine in this modified method will now be described, with reference to a method of producing N-type bismuth-antimony telluride having the constitutional formula $Bi_{1.59}Sb_{0.41}Te_3$. In this method, bismuth, antimony, tellurium and iodine are placed together in a cylindrical silica bomb having a length of about 17.5 centimetres and a diameter of 2.5 centimetres. The total weight of the constituents is made about 300 grams, of which the iodine constitutes about 0.18%, the relative proportions of the bismuth, antimony and tellurium corresponding to bismuth-antimony telluride of the specified composition. The bomb is evacuated to produce inside it a vacuum corresponding to a pressure of less than $10^{-5}$ millimetres of mercury, and is then sealed; the evacuation period is standardised at 15 minutes, in order to make consistent allowance for the volatilisation of iodine which occurs.

The sealed bomb is then heated in a furnace at a temperature of 900° C. for at least three hours, in order to bring about complete formation of the bismuth-antimony telluride and uniform distribution of the iodine. After cooling to room temperature and removal from the bomb, the charge is loaded into a silica boat having dimensions of approximately 15 centimetres by 2.5 centimetres by 1.8 centimetres. The charge is then just melted by high frequency induction heating under an inert atmosphere so that it takes up the shape of the boat, and is then immediately cooled to room temperature to form a solid ingot.

The solidified ingot in the boat is then subjected to the process known as "single pass zone melting," in which a molten zone is formed at one end of the ingot and is caused to traverse the whole length of the ingot; the process is carried out under a slow flow of inert gas at atmospheric pressure, and the rate of advance of the molten zone along the ingot may conveniently be of the order of 2.5 centimetres per hour.

In the case of this method also, the resultant ingot is found to consist of one or more crystals for each of which the principal crystal axis is disposed perpendicular to the longitudinal axis of the ingot; the same remarks therefore apply in this case as are made above concerning the orientation of elements for thermocouples cut from such an ingot.

An ingot prepared by the method just described was found to be uniformly N-type, having at a temperature of 290° K. a thermoelectric power of about $-195$ microvolts/°C. and an electrical conductivity (measured along the length of the ingot) of about 1000 (ohm centimetres)$^{-1}$.

By way of illustration, details are given in Tables I and II below for a number of examples of the semiconductors which may be used in thermocouples according to the parent application. For each of the examples an ingot was prepared by the appropriate one of the methods described above, and details of the composition in each case are given in Table I; in this table there are indicated for each case the values of the coefficients $n$, $q$ and $r$ in the constitutional formula $Bi_mSb_nTe_pSe_qS_r$, together with an indication of the nature and amount of any impurity added to the constituent elements of the semiconductor in the starting material, the amount of the impurity being expressed as a ratio of the weight of the impurity to the total weight of the constituent elements of the semiconductor. For each of the examples measurements were made at a temperature T of 290° K. on samples cut from the relevant ingot, the measurements being made in the direction corresponding to the longitudinal axis of the ingot. The results of these measurements are given in Table II, in which for each case there are indicated the values of the thermoelectric power $\eta$ (positive for P-type material and negative for N-type material), expressed in microvolts/° C., the electrical conductivity $\sigma$, expressed in (ohm centimetres)$^{-1}$, the thermal conductivity $\lambda$, expressed in watts/centimetre °C., and the figure of merit $\phi$ of the material for thermoelectric applications. The figure of merit $\phi$ is equal to $|\eta|\sqrt{T\sigma/\lambda}$; in calculating the values of $\phi$ given in Table II, the thermoelectric power $\eta$ has been expressed in volts/° C., the other quantities T, $\sigma$ and $\lambda$ being expressed in the respective units indicated above.

*Table I*

| Example | $n$ | $q$ | $r$ | Impurity |
|---|---|---|---|---|
| 1 | 0.23 | | | |
| 2 | 0.41 | | | |
| 3 | 0.41 | | | 0.18% Iodine. |
| 4 | 0.90 | | | |
| 5 | 0.90 | | | 0.12% Iodine. |
| 6 | | 0.33 | | |
| 7 | | 0.33 | | 0.06% Lead. |
| 8 | | | 0.13 | 0.075% Lead. |
| 9 | | | 0.22 | 0.06% Iodine. |
| 10 | 0.38 | 0.16 | | 0.1% Iodine. |
| 11 | 0.82 | 0.27 | | |
| 12 | 1.48 | 0.05 | | 4% Tellurium. |
| 13 | 1.58 | 0.21 | | 5% Tellurium. |
| 14 | 0.86 | | 0.10 | |
| 15 | 0.83 | 0.15 | 0.10 | |

*Table II*

| Example | $\eta$ | $\sigma$ | $\lambda$ | $\phi$ |
|---|---|---|---|---|
| 1 | +217 | 720 | 0.0171 | 0.76 |
| 2 | +176 | 1,230 | 0.0165 | 0.82 |
| 3 | −196 | 1,030 | 0.0155 | 0.86 |
| 4 | +147 | 1,740 | 0.0169 | 0.80 |
| 5 | +202 | 810 | 0.0134 | 0.85 |
| 6 | +273 | 305 | 0.0129 | 0.72 |
| 7 | +204 | 740 | 0.0139 | 0.80 |
| 8 | +205 | 740 | 0.0140 | 0.80 |
| 9 | −228 | 545 | 0.0122 | 0.82 |
| 10 | −226 | 590 | 0.0123 | 0.84 |
| 11 | +181 | 860 | 0.0125 | 0.81 |
| 12 | +185 | 1,400 | 0.0158 | 0.94 |
| 13 | +156 | 1,430 | 0.0164 | 0.79 |
| 14 | +169 | 1,100 | 0.0133 | 0.83 |
| 15 | +191 | 625 | 0.0113 | 0.77 |

We claim:

1. A method of preparing thermocouple elements which consist essentially of a semiconductor having a constitutional formula $Bi_mSb_nTe_pSe_qS_r$ (where $n$ has a value in the range 0–1.8, $q$ has a value in the range 0–0.4 and $r$ has a value in the range 0–0.24, subject to the conditions that $m+n=2$, $p+q+r=3$, $3n+2q+2r$ is not less than 0.03, and $3q+5r$ is not greater than 1.2): said method comprising the steps of, melting together in vacuo the constituent elements of the semiconductor in appropriate proportions, producing from the molten material an elongated solid ingot, subjecting the ingot to zone melting, and then cutting the thermocouple elements from the ingot with that dimension of each element which is to extend between the junctions of a thermocouple parallel to the longitudinal axis of the ingot.

2. A method according to claim 1, in which the zone melting process is a reverse pass process.

3. A method according to claim 2, in which the semiconductor is doped by adding to the starting material a small quantity of at least one element selected from the group consisting of tellurium, lithium, lead, cadmium and bismuth.

4. A method according to claim 1, in which the semiconductor is doped by adding to the starting material a small quantity of at least one element selected from the group consisting of iodine, bromine and chlorine, and the zone melting process is a single pass process.

5. A method according to claim 1, in which said constitutional formula is such that both $q$ and $r$ are zero.

References Cited in the file of this patent
UNITED STATES PATENTS

| | | |
|---|---|---|
| 2,762,857 | Lindenblad | Sept. 11, 1956 |
| 2,882,470 | Wernick | Apr. 14, 1959 |
| 2,886,618 | Goldsmid | May 12, 1959 |